(No Model.)
P. M. TRASK.
FRUIT PITTER.
No. 578,790. Patented Mar. 16, 1897.
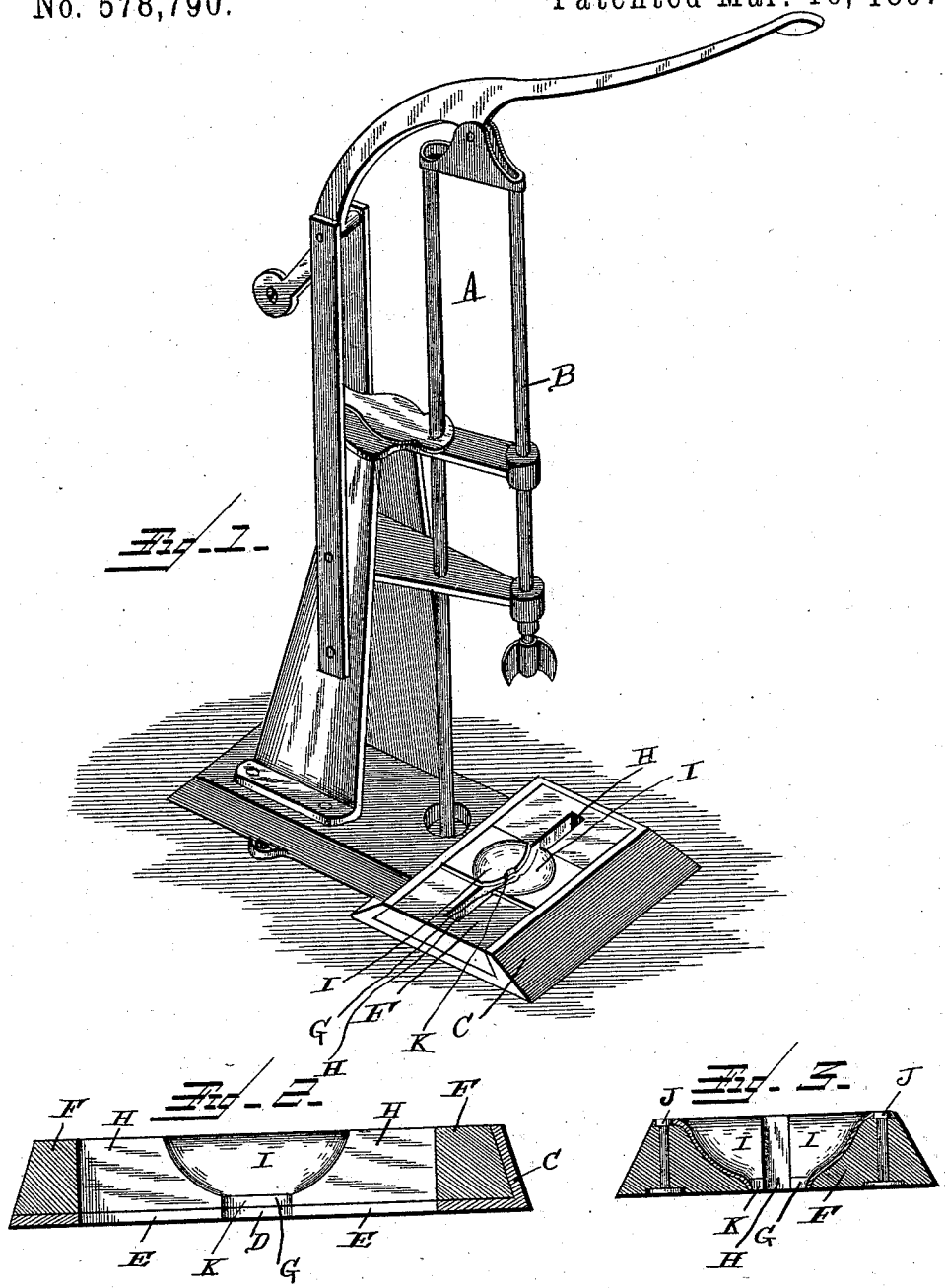
Witnesses
Jos. Gregory.
R. A. Nau.
Inventor,
Prentice M. Trask.
by John Wedderburn
Attorney

United States Patent Office.

PRENTICE MELLEN TRASK, OF COLUMBIA, CALIFORNIA.

FRUIT-PITTER.

SPECIFICATION forming part of Letters Patent No. 578,790, dated March 16, 1897.

Application filed June 11, 1896. Serial No. 595,094. (No model.)

*To all whom it may concern:*

Be it known that I, PRENTICE MELLEN TRASK, a citizen of the United States, residing at Columbia, in the county of Tuolumne and State of California, have invented certain new and useful Improvements in Fruit-Pitters; and I do hereby declare the following to be a full, clear, and exact description of the invention, such as will enable others skilled in the art to which it appertains to make and use the same.

This invention relates to certain new and useful improvements in fruit-pitters, and more particularly to the cushion upon which the fruit is placed while being operated upon; and it has for its object, among others, to provide a simple cheap improved construction of cushion whereby bruising or crushing of the fruit is avoided and which will assist materially in the pitting operation. The cushion is provided with a covering or surface which lengthens the life of the yielding portion thereof, as it prevents direct wear thereupon.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a perspective view of a pitter-cushion embodying the invention. Fig. 2 is a vertical section through the same. Fig. 3 is a vertical section at right angles to Fig. 2.

Like letters of reference indicate like parts in the several views.

Referring now to the details of the drawings by letter, A designates a pitting-machine having cutters and a central pitter B, which is adapted to be vertically reciprocated, and in line with the path of movement of the said cutter and pitter is a lower base-receptacle C, which is open at one end and has inwardly-sloping sides, after manner of a dovetail. The bottom of the said receptacle is formed with an opening D, from which extend oppositely-situated alined slots E. Within the said receptacle is removably mounted a rubber cushion F, having a central opening G and slots H similar to the opening and slots D and E.

The cushion F has beveled sides and ends to fit into the base-receptacle, and extending inwardly from the opposite sides in transverse lines of the center thereof are two metallic plates I, which have their ends secured, as at J, and their inner ends concave and depressed, as at K, and receive the seed without having the same come directly against the rubber of the cushion and thereby avoid wearing and tearing of the latter. By applying these metallic plates to the cushion the latter is preserved and resists injury, and as said cushions are expensive devices to replace, a consequent saving in the matter of expense is insured. The said metal plate or covering does not interfere in the least with the elasticity of the rubber and allows the free passage of the pit or seed through the cushion, no matter what size it may be. Therefore when the orifice in the rubber cushion through which the fruit or seed is passed commences to cut and wear, the sides of said orifice allow not only the pit or seed to pass through, but also some of the fruit, thereby causing a waste, which increases as the size of the orifice increases until the waste of the fruit becomes quite an important item.

The device is exceptionally important in the art, and of course the form of the metallic covering may be changed in accordance with the nature of the slot or opening through the rubber.

Modifications in details may be resorted to without departing from the spirit of the invention or sacrificing any of its advantages.

Having thus described the invention, what is claimed as new is—

1. The combination with a removably-mounted elastic cushion having central opening and slots extending from diametrically opposite sides thereof, of metallic plates having their outer ends secured and their inner ends concaved and disposed and applied over the cushion and having a slot between their adjacent faces, substantially as described.

2. The combination with a removably-mounted elastic cushion having central opening and slots extending from diametrically opposite sides thereof, of metallic plates having their outer ends secured and their inner ends concaved and disposed and applied over the cushion and having a slot between their adjacent faces, and a substantially circular opening at the center thereof whereby the metallic plates protect the elastic cushion and receive the impact of the pitter and fruit, substantially as described.

In testimony whereof I have signed this specification in the presence of two subscribing witnesses.

PRENTICE MELLEN TRASK.

Witnesses:
L. FORSTERLING,
L. C. TIBBITS.